United States Patent
Forcier (12)

(10) Patent No.: US 10,697,323 B2
(45) Date of Patent: Jun. 30, 2020

(54) ENGINE BEARING DAMPER WITH INTERRUPTED OIL FILM

(71) Applicant: United Technologies Corporation, Farmington, CT (US)

(72) Inventor: Matthew J. Forcier, Rocky Hill, CT (US)

(73) Assignee: Raytheon Technologies Corporation, Farmington, CT (US)

(*) Notice: Subject to any disclaimer, the term of this patent is extended or adjusted under 35 U.S.C. 154(b) by 601 days.

(21) Appl. No.: 15/216,180

(22) Filed: Jul. 21, 2016

(65) Prior Publication Data

US 2018/0023418 A1  Jan. 25, 2018

(51) Int. Cl.

| F01D 25/16 | (2006.01) |
|---|---|
| F16C 19/16 | (2006.01) |
| F16C 33/66 | (2006.01) |
| F16C 35/04 | (2006.01) |
| F04D 29/059 | (2006.01) |
| F16C 35/077 | (2006.01) |
| F01D 25/18 | (2006.01) |

(Continued)

(52) U.S. Cl.
CPC ......... *F01D 25/164* (2013.01); *F01D 25/183* (2013.01); *F02C 3/04* (2013.01); *F02C 7/06* (2013.01); *F04D 29/059* (2013.01); *F16C 19/16* (2013.01); *F16C 33/6674* (2013.01); *F16C 33/6677* (2013.01); *F16C 35/04* (2013.01); *F16C 35/077* (2013.01); *F05D 2220/32* (2013.01); *F05D 2240/60* (2013.01)

(58) Field of Classification Search
CPC ...... F01D 25/164; F01D 25/18; F01D 25/183; F02C 3/04; F02C 7/06; F04D 29/059; F16C 19/16; F16C 33/6674; F16C 33/6677; F16C 35/04; F16C 35/077; F05D 2220/32; F05D 2240/60; F16F 15/0237
USPC ......................................................... 60/805
See application file for complete search history.

(56) References Cited

U.S. PATENT DOCUMENTS

| 3,915,521 A | 10/1975 | Young |
|---|---|---|
| 4,251,987 A * | 2/1981 | Adamson ............... F02C 3/113 417/405 |

(Continued)

FOREIGN PATENT DOCUMENTS

JP    2010169066 A    8/2010

OTHER PUBLICATIONS

Luis San Andres, "Notes 13: Squeeze Film Dampers: Operation, Models and Technical Issues", available from: <http://rotorlab.tamu.edu/me626/Notes_pdf/Notes13%20Squeeze%20Film%20Dampers.pdf>, 2010.

(Continued)

*Primary Examiner* — Mark A Laurenzi
*Assistant Examiner* — Loren C Edwards
(74) *Attorney, Agent, or Firm* — Getz Balich LLC

(57) ABSTRACT

Aspects of the disclosure are directed to an engine oil damper comprising: a bearing support, and a housing radially outward from the bearing support and co-axial with the bearing support, where at least one oil flow restrictor is formed with respect to at least one of the bearing support and the housing, where the at least one oil flow restrictor is configured to at least partially interrupt a flow of oil in an annulus radially defined between the bearing support and the housing.

11 Claims, 4 Drawing Sheets

(51) Int. Cl.
*F02C 3/04* (2006.01)
*F02C 7/06* (2006.01)

(56) References Cited

U.S. PATENT DOCUMENTS

| | | | |
|---|---|---|---|
| 4,669,893 A * | 6/1987 | Chalaire | F16F 15/0237 |
| | | | 384/535 |
| 4,721,398 A | 1/1988 | Miyashita | |
| 4,721,441 A | 1/1988 | Miyashita | |
| 4,806,075 A | 2/1989 | Osterstrom | |
| 4,943,170 A | 7/1990 | Aida | |
| 4,947,639 A | 8/1990 | Hibner | |
| 5,048,978 A | 9/1991 | Singh | |
| 5,253,985 A | 10/1993 | Ruetz | |
| 5,839,268 A | 11/1998 | Morris | |
| 6,109,791 A | 8/2000 | Metton | |
| 6,155,720 A | 12/2000 | Battig | |
| 6,996,968 B2 | 2/2006 | Peters | |
| 8,646,251 B2 | 2/2014 | Rosenkrans | |
| 9,074,531 B2 | 7/2015 | Grabowski | |
| 2007/0086685 A1 * | 4/2007 | Klusman | F01D 25/125 |
| | | | 384/99 |
| 2013/0202432 A1 | 8/2013 | House et al. | |
| 2013/0294917 A1 | 11/2013 | Alam | |

OTHER PUBLICATIONS

Fouad Y. Zeidan, "Design and Application of Squeeze Film Dampers in Rotating Machinery", Proceedings of the Twenty-Fifth Turbomachinery Symposium, pp. 169-188, available at least as of Jun. 2, 2016.
EP search report for EP17181238.1 dated Aug. 23, 2017.

* cited by examiner

ENGINE BEARING DAMPER WITH INTERRUPTED OIL FILM

BACKGROUND

Gas turbine engines, such as those which power aircraft and industrial equipment, employ a compressor to compress air that is drawn into the engine and a turbine to capture energy associated with the combustion of a fuel-air mixture. Oil is used in the engine for purposes of cleaning, cooling, and lubricating components, such as bearings that support one or more shafts of the engine.

Referring to FIG. 2A, an engine oil film damper 200, frequently referred to in the art as a squeeze film damper, uses oil trapped in an annulus 206 defined between a fixed housing 210 and a floating bearing support 214 to damp vibrations in the bearing. The vibrations may be caused by a number of factors, such as an imbalance or a deflection that may exist in the rotational hardware (e.g., rotor) of the engine.

Referring to FIGS. 2A-2B, seals 222a and 222b are used to trap the oil in the annulus 206. The seals 222a and 222b are adjacent to stop clearances 226a and 226b, respectively. There is a substantially constant radial clearance 234 between the housing 210 and a bearing support floor 214a of the bearing support 214, where the bearing support floor 214a is radially inboard/recessed relative to the stop clearances 226a and 226b. As the engine is operated, the oil trapped in the annulus 206 travels around the annulus 206 in a full 360 degree manner.

The oil in the annulus 206 dampens the vibrations that are experienced by providing a resistance to the vibration, or analogously, by providing a restorative force to the bearing support 214 in response to the vibration. The damping may be enhanced by increasing the oil supply pressure, but such an increase in oil supply pressure represents an increase in cost. Accordingly, what is needed are improvements in the design and manufacture of engine bearing dampers that increase the effectiveness/efficiency of the damper without incurring additional penalties/cost in terms of the supporting oil system.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an engine oil damper comprising: a bearing support, and a housing radially outward from the bearing support and co-axial with the bearing support, where at least one oil flow restrictor is formed with respect to at least one of the bearing support and the housing, where the at least one oil flow restrictor is configured to at least partially interrupt a flow of oil in an annulus radially defined between the bearing support and the housing. In some embodiments, the at least one oil flow restrictor includes a plurality of oil flow restrictors. In some embodiments, a first dimension of a first of the oil flow restrictors is different from a second counterpart dimension of a second of the oil flow restrictors. In some embodiments, the plurality of oil flow restrictors includes at least three oil flow restrictors, and a first spacing between the first and second oil flow restrictors is different from a second spacing between the second and third oil flow restrictors. In some embodiments, the at least one oil flow restrictor includes first and second walls that project in a substantially radial reference direction between a floor and a ceiling. In some embodiments, the at least one oil flow restrictor is defined with respect to the housing. In some embodiments, the at least one oil flow restrictor is defined with respect to the bearing support. In some embodiments, a clearance between the bearing support and the housing varies around a circumference of the damper. In some embodiments, the clearance varies between a maximum value defined by a floor of the bearing support and a minimum value defined by a ceiling of the at least one oil flow restrictor. In some embodiments, the ceiling is radially inward of a stop clearance. In some embodiments, the engine oil damper further comprises: a first seal, and a second seal axially aft of the first seal, where the annulus is axially defined between the first seal and the second seal. In some embodiments, the annulus is continuous around a circumference of the damper. In some embodiments, the engine oil damper further comprises an axial seal associated with the at least one oil flow restrictor.

Aspects of the disclosure are directed to an engine comprising: a compressor, a combustor located axially aft of the compressor, a turbine located axially aft of the combustor, a shaft coupled to the compressor and the turbine, and an engine oil damper including: a bearing support coupled to the shaft, and a housing radially outward from the bearing support, where at least one oil flow restrictor is formed with respect to at least one of the bearing support and the housing, where the at least one oil flow restrictor is configured to at least partially interrupt a flow of oil in an annulus radially defined between the bearing support and the housing. In some embodiments, the at least one oil flow restrictor is defined with respect to the bearing support, where a clearance between the bearing support and the housing varies around a circumference of the damper, where the clearance varies between a maximum value defined by a floor of the bearing support and a minimum value defined by a ceiling of the at least one oil flow restrictor, and the ceiling is radially inward of a stop clearance.

Aspects of the disclosure are directed to an engine oil damper comprising: a bearing support, and a housing radially outward from the bearing support and co-axial with the bearing support, where the housing includes a circumferential perimeter that includes a plurality of radial projections such that a first radial clearance distance between the housing and the bearing support is less between each of the plurality of radial projections and the bearing support than a second radial clearance distance between the housing circumferential perimeter adjacent to one of the radial projections and the bearing support.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

Figure 1:
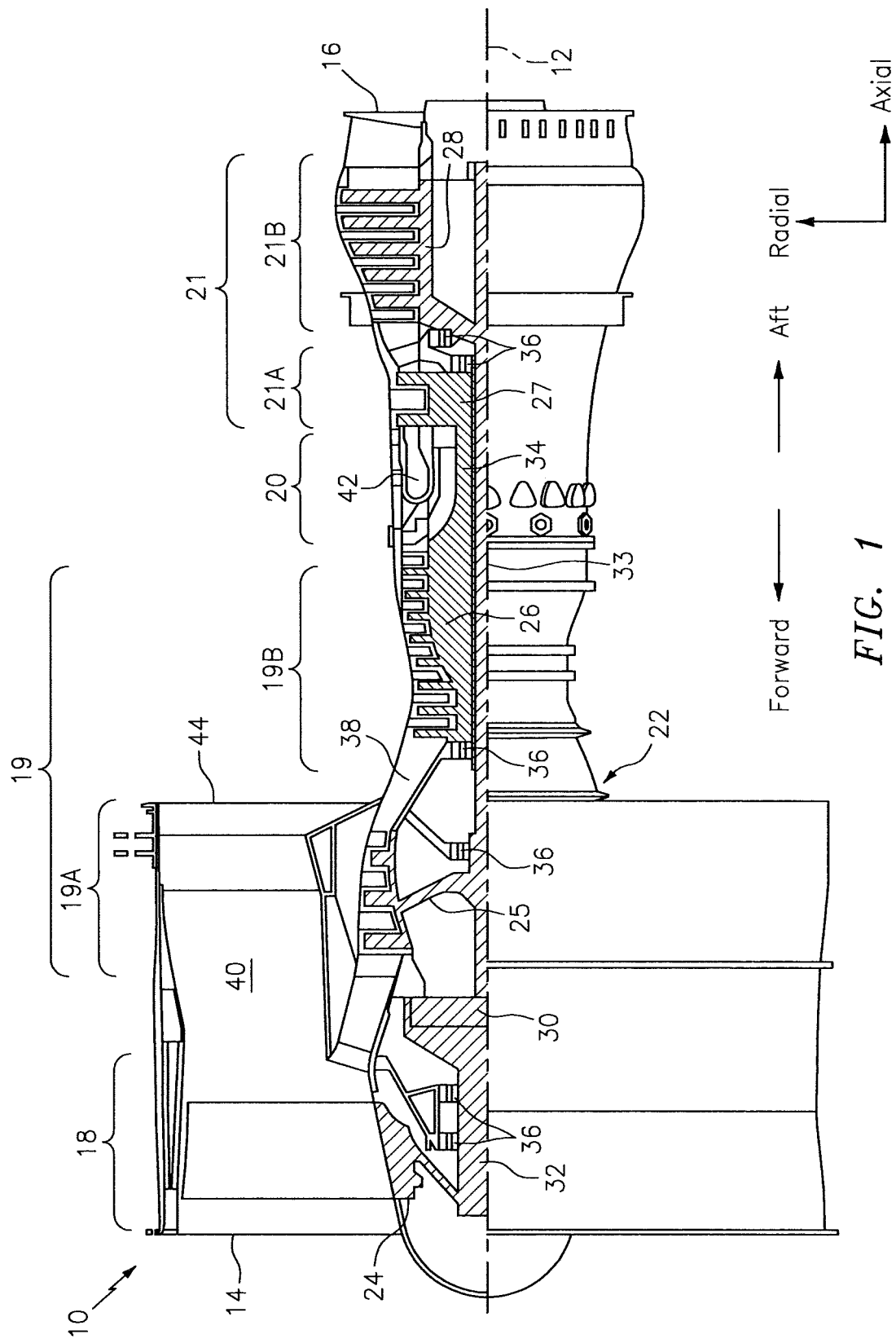
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to an engine oil film damper. The damper may include an annulus defined between a fixed housing and a floating bearing support. The annulus may be at least partially interrupted by one or more oil flow restrictors/projections, where an oil flow restrictor may be defined/formed with respect to one or both of the housing and the bearing support.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3B:
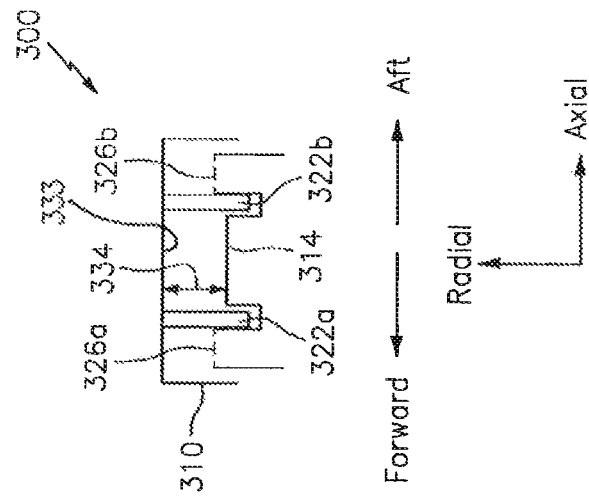
FIGS. 3A-3D illustrate an engine oil film damper in accordance with aspects of this disclosure, with the cross-sectional view shown in FIG. 3B taken about the line 3B-3B in FIG. 3A.
Figure 3A:
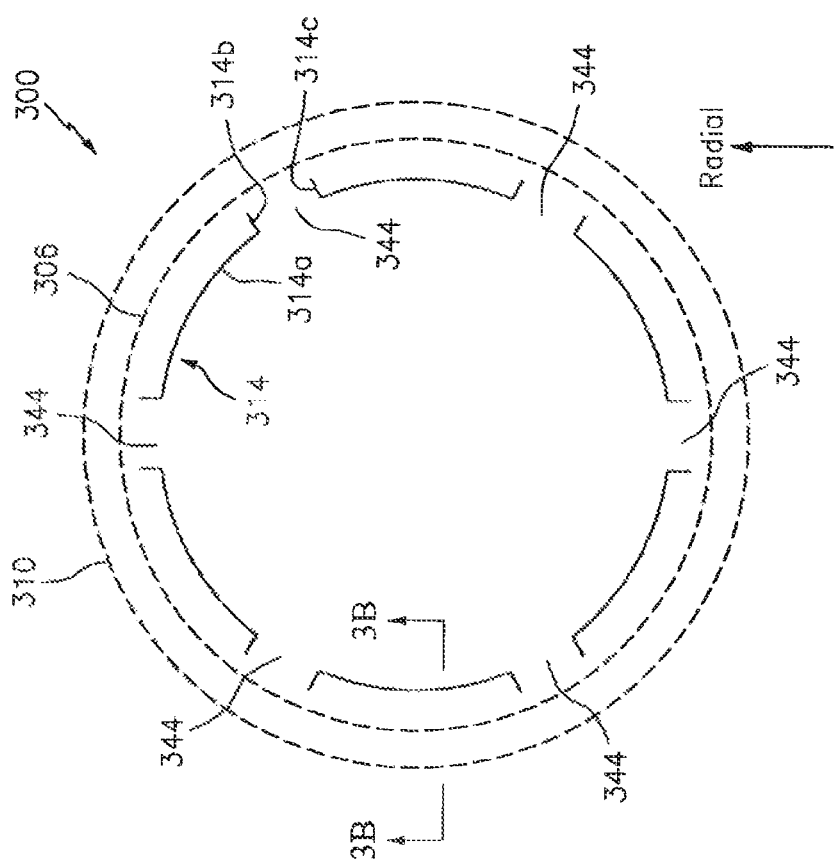

Referring to FIG. 3A, an engine oil film damper 300 is shown. The damper 300 may use oil trapped in an annulus 306 defined between a fixed housing 310 and a floating bearing support 314 to damp vibrations in a bearing (e.g., bearing 36 of FIG. 1). As shown, the housing 310 and the bearing support 314 may be co-axial with respect to one another.

Referring to FIGS. 3A-3B, seals 322a and 322b may assist in trapping the oil in the annulus 306. The seals 322a and 322b may be proximate or adjacent to stop clearances 326a and 326b, respectively.

Figure 2B:
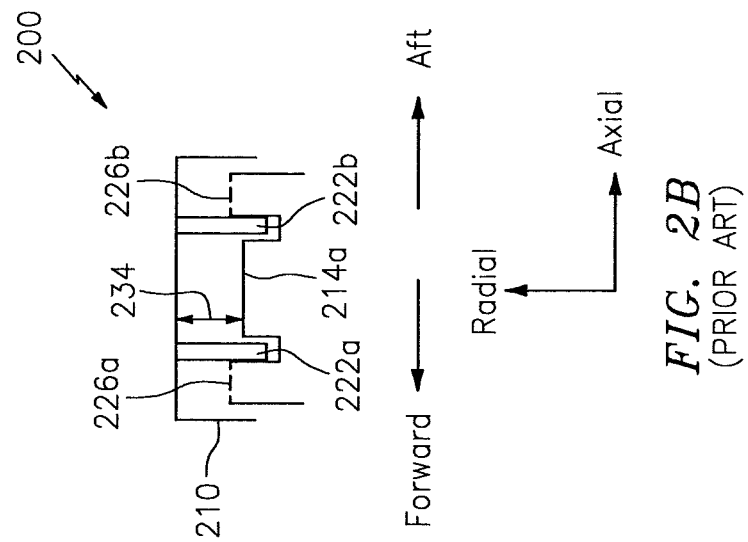
FIGS. 2A-2B illustrate a prior art engine oil film damper, with the cross-sectional view shown in FIG. 2B taken about the line 2B-2B in FIG. 2A.
Figure 2A:
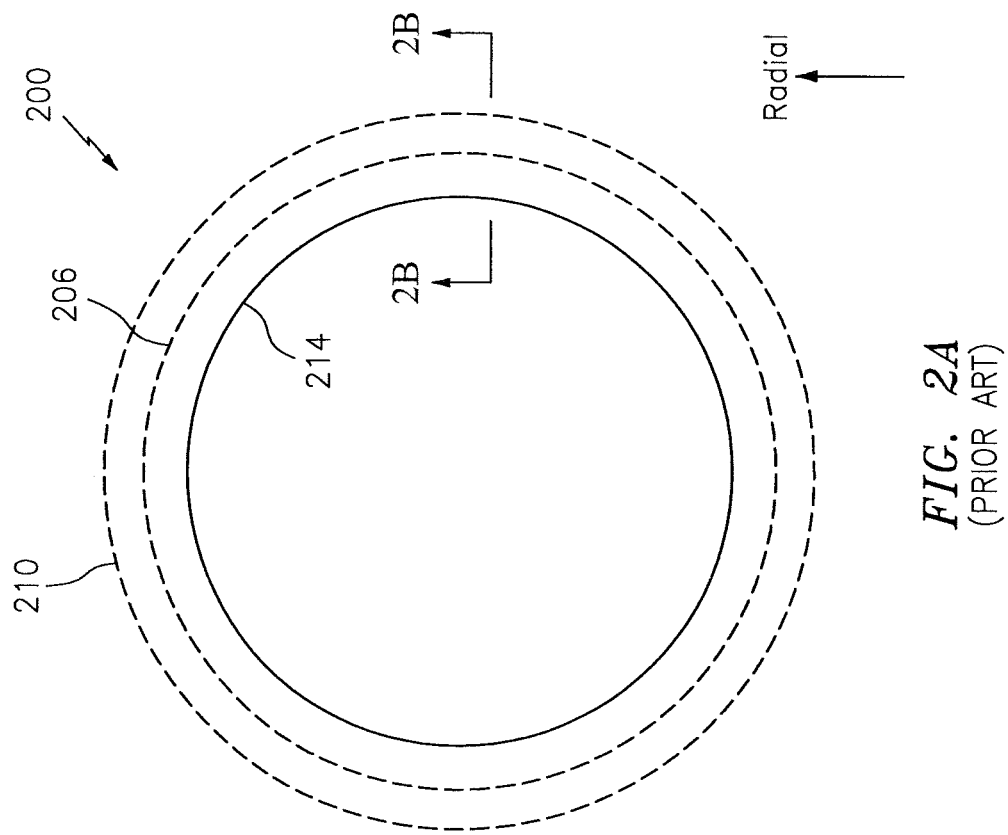

In contrast to the damper 200 shown in connection with FIGS. 2A-2B, in FIGS. 3A-3B the bearing support 314 of the damper 300 is shown as having a circumferentially extending outer radial surface with one or more first portions (i.e., floors 314a) disposed at a first distance from the axial centerline 12 and substantially radially oriented walls 314b and 314c. The portion of the bearing support 314 defined between the walls 314b and 314c may form/define one or more oil flow restrictors 344 having one or more second portions (i.e., one or more oil flow restrictors 344 having a ceiling 314d disposed at a second radial distance from the axial centerline 12 (see FIGS. 3A and 3C). The second radial distance of the ceilings 314d from the axial centerline 12 may be greater than the first radial distance of the floors 314a from the axial centerline 12. Each one of the one or more flow restrictors 344 may be circumferentially spaced apart from each other flow restrictor of the one or more flow restrictors 344 by one of the plurality of floors 314a. The ceiling 314d may be radially inward of one or both of the stop clearances 326a and 326b (see FIGS. 3B-3C).

In contrast to the damper 200 of FIGS. 2A-2B in which the clearance 234 (and hence, the annulus 206) is substantially uniform around the 360 degree circumference of the damper 200, the clearance 334 between the bearing support 314 and an inner radial surface 333 of the housing 310 (see FIGS. 3A-3B) may not be uniform around the 360 degree circumference of the damper 300. Instead, the clearance 334 (and hence, the annulus 306) may vary based on the circumferential location at which the clearance 334 is measured. For example, the clearance 334 may have a maximum value measured relative to the floor 314a, The clearance 334 may have a minimum value measured relative to the ceiling 314d.

While FIG. 3A shows the use of six restrictors 344, any number of restrictors 344 may be used in some embodiments. Also, while the spacing between the restrictors 344 is substantially uniform (e.g., the restrictors 344 are equidistantly spaced from one another) in FIG. 3A, in some embodiments a non-uniform spacing between the restrictors 344 may be used. Also, a given dimension (e.g., axial length, circumferential width, and/or radial height) of a first restrictor 344 may be different from a counterpart dimension of a second restrictor 344. The use of non-uniform spacing between the restrictors 344 or the use of one or more varied dimension(s) between first and second restrictors 344 may assist in avoiding the creation of a resonant condition in the annulus 306. A restrictor 344 may assume various shapes/form factors, which represents another factor that may be iterated upon or modified in the manufacture of a damper.

Figure 3D:
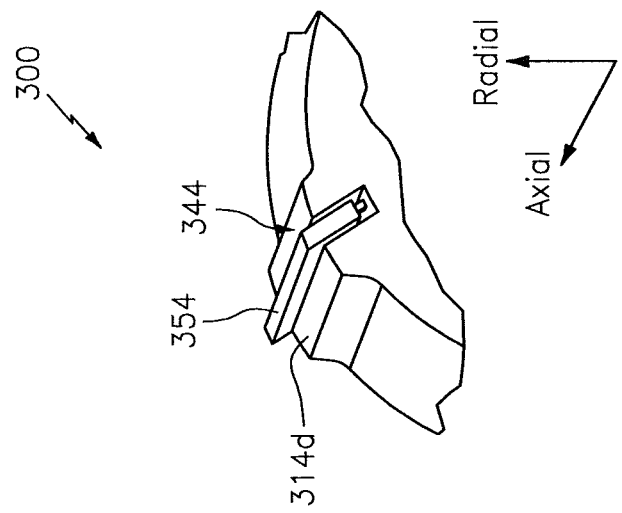
Figure 3C:
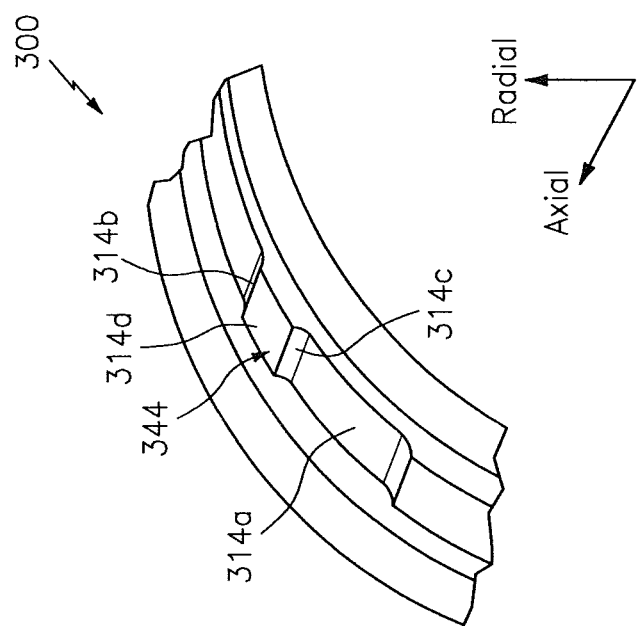

In some embodiments, one or more (axial) seals 354 may be used (see FIG. 3D). The seal 354 may be associated with and may be used to provide further definition to the restrictor 344. The seal 354 may create smaller orifices for the oil to pass through.

While the restrictors of some of the examples described above were defined with respect to the structure of the bearing support, one skilled in the art would appreciate based on a review of this disclosure that a restrictor may be at least partially defined with respect to the structure of the housing. For example, whereas the restrictor 344 of FIGS. 3A-3D is shown as projecting radially outward from the bearing support 314, a counterpart restrictor could be formed in the housing 310, wherein that counterpart restrictor may project radially inward from the housing 310 towards the engine centerline 12 (or towards the bearing support 314).

In accordance with aspects of this disclosure, oil pressure within an annulus may be enhanced/increased via the use of one or more restrictors. A count of restrictors, a dimension of a restrictor, a shape of a restrictor, and a spacing between restrictors may be selected based on a desired oil pressure within the annulus. One or more parameters associated with one or more restrictors may be used to control a pressure of oil within an annulus. The use of one or more restrictors in a first embodiment may reduce a volume of an annulus relative to a second embodiment in which the restrictor(s) is/are absent.

Technical effects and benefits of this disclosure include a damper that includes one or more restrictors. A restrictor may be defined with respect to one or both of a bearing support or a housing. The restrictor may alter a clearance (or analogously, a dimension of an annulus) defined between the bearing support and the housing. This alteration in the clearance may assist in resisting the flow of oil and create an oil through orifice situation to dissipate energy associated with one or more deflections/vibrations.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An engine oil damper having an axial centerline, the engine oil damper comprising:
   a bearing support;
   a housing radially outward from the bearing support and co-axial with the bearing support; and
   a plurality of oil flow restrictors extending radially a first radial distance from a floor, defined by at least one of a radially outermost surface of the bearing support and a radially innermost surface of the housing, to a ceiling, which is less than a second radial distance extending from the bearing support to the housing so as to define a clearance radially adjacent the ceiling, the plurality of oil flow restrictors circumferentially spaced from one another;
   wherein the plurality of oil flow restrictors is configured to at least partially restrict a flow of oil in an annulus radially defined between the bearing support and the housing;
   wherein each of the plurality of oil flow restrictors includes the ceiling defining a distal surface of the respective oil flow restrictor with respect to the floor and first and second walls that project in a substantially radial reference direction between and connect the floor and the ceiling; and
   wherein the bearing support includes at least one stop clearance extending radially from the floor of the bearing support and wherein the respective ceiling of each of the plurality of oil flow restrictors is radially inward of a radially outer surface of the at least one stop clearance.

2. The engine oil damper of claim 1, wherein a first dimension of a first of the plurality of oil flow restrictors is different from a second counterpart dimension of a second of the plurality of oil flow restrictors.

3. The engine oil damper of claim 1, wherein the plurality of oil flow restrictors includes at least three oil flow restrictors, and wherein a first spacing between circumferentially adjacent first and second oil flow restrictors of the at least three oil flow restrictors is different from a second spacing between circumferentially adjacent second and third oil flow restrictors of the at least three oil flow restrictors.

4. The engine oil damper of claim 1, wherein each of the plurality of oil flow restrictors extends radially inward from the floor of the housing.

5. The engine oil damper of claim 1, wherein each of the plurality of oil flow restrictors extends radially outward from the floor of the bearing support.

6. The engine oil damper of claim 5, wherein a clearance between the bearing support and the housing varies around a circumference of the damper.

7. The engine oil damper of claim 6, wherein the clearance between the bearing support and the housing varies between a maximum value defined by the floor of the bearing support and a minimum value defined by the respective ceiling of each of the plurality of oil flow restrictors.

8. The engine oil damper of claim 1, further comprising:
   a first seal; and
   a second seal axially spaced from the first seal,
   wherein the annulus is axially defined between the first seal and the second seal.

9. The engine oil damper of claim 1, wherein the annulus is continuous around a circumference of the damper.

10. The engine oil damper of claim 1, further comprising:
    an axial seal extending from at least one of the plurality of oil flow restrictors.

11. An engine comprising:
    a compressor;
    a combustor located axially aft of the compressor;
    a turbine located axially aft of the combustor;
    a shaft coupled to the compressor and the turbine; and
    an engine oil damper having an axial centerline, the engine oil damper including:
       a bearing support coupled to the shaft, the bearing support having a circumferentially extending outer radial surface with a plurality of first portions disposed at a first radial distance from the axial centerline, and a plurality of second portions disposed at a second radial distance from the axial centerline, wherein the second radial distance is greater than the first radial distance, and each of the plurality of second portions is spaced apart from another of the plurality of second portions by one of the plurality of first portions; and a housing disposed radially outward from the bearing support and co-axial with the bearing support, and having an inner radial surface disposed at a third radial distance from the axial centerline, wherein the third radial distance is greater than the second radial distance;

wherein the plurality of second portions of the circumferentially extending outer radial surface is radially spaced from the housing so as to define a radial clearance therebetween;

wherein the plurality of second portions are configured to at least partially restrict a flow of oil in an annulus radially defined between the bearing support and the housing; and wherein the bearing support includes a stop clearance extending radially outward from an axial end of the circumferentially extending outer radial surface of the bearing support and each of the plurality of second portions is radially inward of a radially outer surface of the stop clearance.

* * * * *